US009189256B2

(12) United States Patent
Lawton et al.

(10) Patent No.: US 9,189,256 B2
(45) Date of Patent: Nov. 17, 2015

(54) METHOD AND APPARATUS FOR UTILIZING USER IDENTITY

(75) Inventors: Simon Lawton, Hampshire (GB); Peter Dalton, Herts (GB)

(73) Assignee: Nokia Technologies Oy, Espoo (FI)

( * ) Notice: Subject to any disclaimer, the term of this patent is extended or adjusted under 35 U.S.C. 154(b) by 151 days.

(21) Appl. No.: 12/274,953

(22) Filed: Nov. 20, 2008

(65) Prior Publication Data

US 2010/0125654 A1 May 20, 2010

(51) Int. Cl.
G06F 15/173 (2006.01)
G06F 9/445 (2006.01)
H04W 88/06 (2009.01)
G06F 21/41 (2013.01)

(52) U.S. Cl.
CPC ............ *G06F 9/44505* (2013.01); *G06F 21/41* (2013.01); *H04W 88/06* (2013.01)

(58) Field of Classification Search
USPC ........................................................ 709/223
See application file for complete search history.

(56) References Cited

U.S. PATENT DOCUMENTS

| 5,987,325 | A  | * | 11/1999 | Tayloe ........................ 455/435.2 |
| 6,466,232 | B1 | * | 10/2002 | Newell et al. .................. 715/700 |
| 6,606,491 | B1 | * | 8/2003  | Peck .............................. 455/411 |
| 6,826,755 | B1 |   | 11/2004 | Kabir et al. |
| 7,003,319 | B1 | * | 2/2006  | Howell et al. ................. 455/558 |
| 7,181,441 | B2 | * | 2/2007  | Mandato et al. ....................... 1/1 |
| 7,225,409 | B1 | * | 5/2007  | Schnarel et al. .............. 715/747 |
| 7,324,528 | B2 | * | 1/2008  | Szlam ........................... 370/401 |
| 2002/0181398 | A1 | * | 12/2002 | Szlam ........................... 370/230 |
| 2002/0194297 | A1 |   | 12/2002 | Jen |
| 2003/0055735 | A1 | * | 3/2003  | Cameron et al. ................. 705/26 |
| 2003/0119482 | A1 | * | 6/2003  | Girard ............................ 455/411 |
| 2004/0102182 | A1 | * | 5/2004  | Reith et al. .................... 455/410 |
| 2004/0249915 | A1 | * | 12/2004 | Russell ......................... 709/223 |
| 2005/0075115 | A1 | * | 4/2005  | Corneille et al. .......... 455/456.3 |
| 2005/0088999 | A1 | * | 4/2005  | Waylett et al. ................ 370/338 |
| 2005/0105731 | A1 | * | 5/2005  | Basquin ........................ 380/247 |
| 2005/0108239 | A1 |   | 5/2005  | Evans et al. |
| 2005/0108372 | A1 |   | 5/2005  | Guo et al. |
| 2005/0108534 | A1 | * | 5/2005  | Bajikar et al. ................ 713/172 |
| 2005/0130641 | A1 | * | 6/2005  | Lorraine Scott ............. 455/418 |
| 2005/0163093 | A1 | * | 7/2005  | Garg et al. .................... 370/342 |
| 2005/0239505 | A1 | * | 10/2005 | Jeannerod ..................... 455/558 |
| 2006/0015819 | A1 | * | 1/2006  | Hawkins et al. .............. 715/780 |

(Continued)

FOREIGN PATENT DOCUMENTS

EP    1887463   A1    2/2008

OTHER PUBLICATIONS

International Search Report and Written Opinion received in corresponding Patent Cooperation Treaty Application No. PCT/FI2009/050783, dated Mar. 16, 2010, 16 pages.

(Continued)

*Primary Examiner* — Blake Rubin
(74) *Attorney, Agent, or Firm* — McClure and Associates, PLLC

(57) ABSTRACT

In accordance with an example embodiment of the present invention, an apparatus, comprising a processor configured to receive an input operation related to selecting at least a part of information related to a first user identity and at least a part of information related to a second user identity, utilize information related to the first user identity based at least in part on the input operation, and utilize information related to second user identity based at least in part on the input operation is disclosed.

30 Claims, 6 Drawing Sheets

(56) References Cited

U.S. PATENT DOCUMENTS

| | | | |
|---|---|---|---|
| 2006/0293028 A1* | 12/2006 | Gadamsetty et al. | 455/411 |
| 2007/0104182 A1* | 5/2007 | Gorti et al. | 370/352 |
| 2007/0259691 A1* | 11/2007 | Santos Garcia | 455/558 |
| 2007/0275767 A1 | 11/2007 | Steele | |
| 2008/0081609 A1* | 4/2008 | Burgan et al. | 455/425 |
| 2008/0130524 A1* | 6/2008 | Volach et al. | 370/259 |
| 2008/0147811 A1 | 6/2008 | Schroeder et al. | |
| 2008/0148030 A1 | 6/2008 | Goffin | |
| 2008/0167074 A1* | 7/2008 | Van Steenbergen | 455/558 |
| 2008/0209338 A1 | 8/2008 | Li | |
| 2008/0311899 A1* | 12/2008 | Moriwaki et al. | 455/422.1 |
| 2009/0029736 A1* | 1/2009 | Kim et al. | 455/558 |
| 2009/0034514 A1* | 2/2009 | Hawkins et al. | 370/352 |
| 2009/0182821 A1* | 7/2009 | Allen et al. | 709/206 |
| 2009/0212908 A1* | 8/2009 | Lin et al. | 340/5.81 |
| 2009/0228807 A1* | 9/2009 | Lemay | 715/752 |
| 2009/0259691 A1* | 10/2009 | Tanskanen et al. | 707/200 |
| 2009/0287922 A1* | 11/2009 | Herwono et al. | 713/155 |
| 2010/0125905 A1 | 5/2010 | Samuels | |
| 2010/0190491 A1* | 7/2010 | Castrogiovanni et al. | 455/426.1 |
| 2010/0210304 A1* | 8/2010 | Huslak | 455/558 |
| 2010/0279698 A1* | 11/2010 | Wong | 455/450 |
| 2010/0332635 A1* | 12/2010 | Rogel et al. | 709/223 |
| 2012/0282891 A1* | 11/2012 | Mohammed et al. | 455/406 |

OTHER PUBLICATIONS

Wireless networking protocols, such as 802.11, short-range wireless protocols, such as Bluetooth, and/or the like.

International Search Report and Written Opinion received in corresponding Patent Cooperation Treaty Application No. PCT/FI2009/050782, dated Mar. 3, 2010, 16 Pages.

"Use of multiple SIM cards in mobile phones", by consumers in Italy, Finland & Portugal—Summary of Oftel Research, World Wide, Apr.-May 2001, 13 Pages, Webpage available at: http://www.ofcom.org.uk/static/archive/oftel/publications/research/2001/sim0701.htm.

"Digital Photography School / Discuss", retrieved on Aug. 28, 2010, webpage available at: http://www.flickr.com/groups/digitalps/discuss/72157594237881843/.

Global Sources Direct, "Dual Sim Card Adapter", http://www.globalsourcesdirect.com/servlet/the-1681/Dual-Sim-Card-Adapter/Detail, printed May 19, 2011.

European Search Report received for Patent Application No. 09827223.0, dated Oct. 4, 2012, 6 pages.

Office Action received for corresponding Chinese Application No. 200980144481.0, dated Apr. 3, 2013, 10 pages.

* cited by examiner

ABSTRACT

METHOD AND APPARATUS FOR UTILIZING USER IDENTITY

RELATED APPLICATIONS

This application also relates to U.S. patent application, entitled "METHOD AND APPARATUS FOR ASSOCIATING USER IDENTITY", which is being filed concurrently and is hereby incorporated by reference in its entirety.

TECHNICAL FIELD

The present application relates generally to user identity.

BACKGROUND

There has been a recent surge in the use of networking devices. The growth of networking devices has been accompanied by a surge in programs utilizing networks to send and receive data. For example, a program may use a network to send and/or retrieve an image, a video, a message, text, and/or the like. Utilization of a network may be associated with a user identity. A user who utilizes more than one network may utilize more than one user identity.

SUMMARY

Various aspects of examples of the invention are set out in the claims.

According to a first aspect of the present invention, an apparatus comprising a processor configured to receive an input operation related to selecting at least a part of information related to a first user identity and at least a part of information related to a second user identity, utilize information related to the first user identity based at least in part on the input operation, and utilize information related to second user identity based at least in part on the input operation is disclosed.

According to a second aspect of the present invention, a method comprising receiving an input operation related to selecting at least a part of information related to a first user identity and at least a part of information related to a second user identity, utilizing information related to the first user identity based at least in part on the input operation, and utilizing information related to second user identity based at least in part on the input operation is disclosed.

According to a third aspect of the present invention, a computer program product comprising a computer-readable medium bearing computer program code embodied therein for use with a computer, the computer program code comprising code for receiving an input operation related to selecting at least a part of information related to a first user identity and at least a part of information related to a second user identity, code for utilizing information related to the first user identity based at least in part on the input operation, and code for utilizing information related to second user identity based at least in part on the input operation is disclosed.

According to a fourth aspect of the present invention, a computer-readable medium encoded with instructions that, when executed by a computer, perform receiving an input operation related to selecting at least a part of information related to a first user identity and at least a part of information related to a second user identity, utilizing information related to the first user identity based at least in part on the input operation, and utilizing information related to second user identity based at least in part on the input operation is disclosed

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are best understood by referring to FIGS. 1A through 8 of the drawings.

A user of an electronic device may have more than one user identity, for example, if the user utilizes more than one network, if the user has different user identities for work and personal use, and/or the like. In such a situation, the electronic device may operate with more than one user identity. Such an electronic device may allow a user to access these networks using the same device without reconfiguring user identity. For example, an electronic device may have two user identity modules (UIM) that allow the electronic device to connect to two different networks. A user may be allowed to control how each user identity is utilized.

Figure 5A:
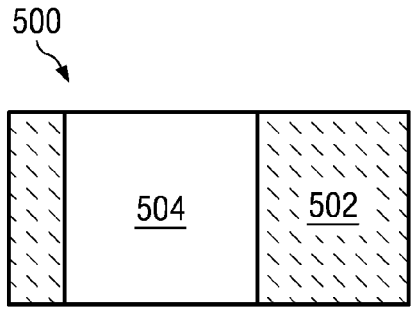
FIGS. 5A-5D are diagrams illustrating a virtual screen according to an example embodiment of the invention.
Figure 6A:
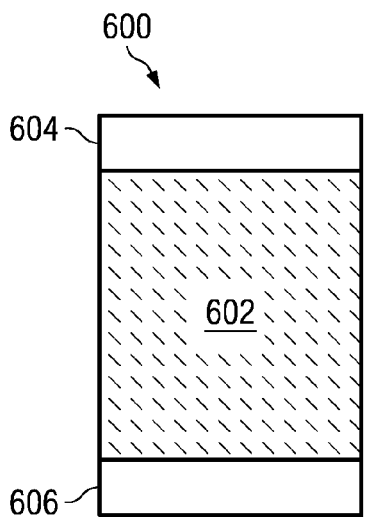
FIGS. 6A and 6B are diagrams illustrating a screen according to an example embodiment of the invention.

A device may comprise a screen, for example screen 600 of FIG. 6A, that may be customized by a user. For example, a user may customize wallpaper, programs that may be readily started, information displayed, and/or the like. In some circumstances, the user may desire to access more information on the screen than is desirable to display at one time. It may be desirable to utilize a virtual screen, for example virtual screen 500 of FIG. 5A, for this information. A virtual screen may be utilized so that a user may be able to view at least part of the desired information when the information may not be desirable to display at one time. For example, if a virtual screen comprises more information than displayed, the user may pan to view the non-displayed information.

A user may be allowed to control how information related to a user identity and information related to another user identity are utilized. For example, a user may desire to utilize information related to a user identity differently than information related to another user identity. In such an example, a user may desire to utilize information related to a first user identity for managing contact information and making and receiving phone calls and messages. In such an example, the user may desire to utilize information related to a second user identity for receiving phone calls and messages.

In an example embodiment, a device allows a user to set the way information associated with more than one user identity is utilized. For example, the device may allow a user to set the way information related to a user identity is utilized differently than the way information related to a different user identity is utilized.

Information related to a user identity may be used to determine information for a virtual screen. For example, a user may perform different operations when utilizing different user identities. In such an example, the virtual screen may provide the user with a different experience depending on the way each user identity is utilized. Furthermore, in such an example, there may be a program, such as a program stored on a user identity module (SIM), which is associated with a user identity that the user may benefit from being able to start from the virtual screen. In another example, a user may have a different virtual screen presentation for a different utilization of user identity information. In such an example, the user may be able to easily distinguish which user identity is being used by glancing at part of the virtual screen.

In an example embodiment, a user who utilizes more than one user identity may utilize them differently. For example, a user who utilizes a user identity for a personal purpose may desire to have a family photo for wallpaper, a music program that can be readily started, and/or the like. In such an example, the user may have a virtual screen arranged in this manner. In another example, a user who utilizes a user identity for business may desire to have a company logo for wallpaper, a meeting calendar shown, an email program easily started, and/or the like. In such an example, the user may have virtual screen arranged in this manner.

In an example embodiment, a device allows a user to utilize a user identity profile to administer the way information related to a user identity is utilized. For example, the device may allow a user to administer the information relating to the manner a user identity is utilized under different circumstances. For example, a user may desire to utilize a first user identity for making phone calls and setting wallpaper and may desire to utilize a second user identity for receiving phone calls in some circumstances. In such an example, the user may desire to utilize the second user identity for making phone calls and setting wallpaper and may desire to utilize the first user identity for receiving phone calls in other circumstances. The user may administer the utilization of information related to the user identities by utilizing user identity profiles.

The manner in which a user identity profile governs utilization of user identity information may relate to the setting of one or more information controls. An information control, for example information control 106 of FIG. 1A, may relate to a way a part of user identity information is utilized. In such an example, an information control may relate to a utilization of contact information, account information, and/or the like. In another example, an information control may relate to setting volume, sending a message, receiving a message, making a phone call, receiving a phone call, forwarding a phone call, providing information on a virtual screen, and/or the like. In such an example, an information control may relate to providing information on a virtual screen relating to a wallpaper, a program, a calendar, text information, and/or the like.

Figure 1A:
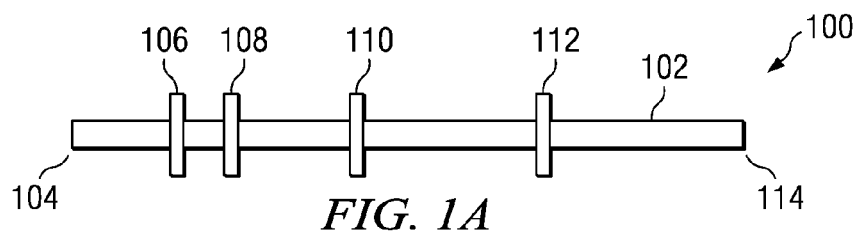
FIGS. 1A-1C are diagrams showing representations of a user identity profile according to an example embodiment of the invention.

In an example embodiment, a user identity profile, for example user identity profile 100 of FIG. 1A, relates to an arrangement of one or more information controls. For example, the one or more information controls may be arranged such that selecting one or more information controls may be performed by selecting at least part of the arrangement. For example, a user identity profile may comprise a continuum that comprises an arrangement of information controls.

In an example embodiment, a user identity may be associated with a user identity profile. For example, a user identity profile may be used to determine how to utilize information related to a user identification.

Figure 1B:
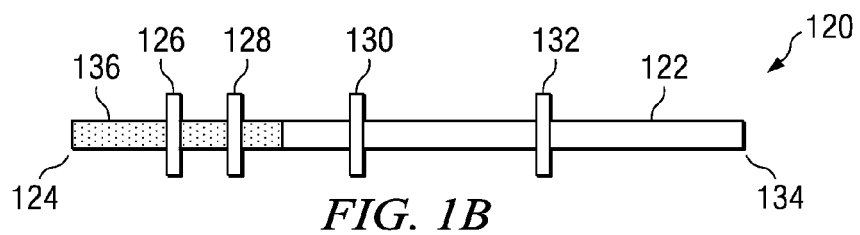
Figure 1C:
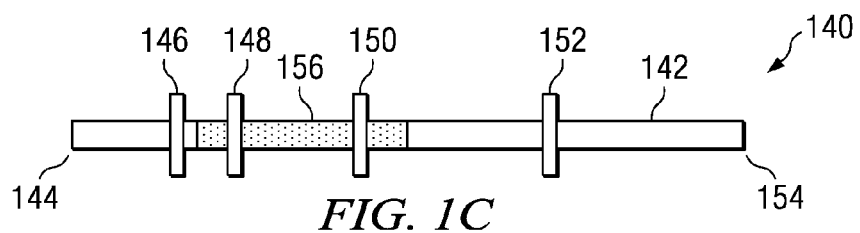

FIGS. 1A-1C are diagrams showing representations of a user identity profile according to an example embodiment of the invention.

FIG. 1A is a diagram showing a representation of a user identity profile 100 according to an example embodiment of the invention. Block 102 relates to a continuum with a low end 104 and a high end 114. Blocks 106, 108, 110, and 112 relate to information controls arranged with respect to continuum 102. In an example embodiment, information control 106 is arranged higher than low end 104, but arranged lower than information control 108, which is arranged lower than information control 110, which is arranged lower than information control 112, which is arranged lower than high end 114.

The arrangement of blocks 106, 108, 110, and 112 may be predetermined, configurable, and/or the like. For example, the arrangement of blocks 106, 108, 110, and 112 may be determined by a default setting. In another example, the arrangement of blocks 106, 108, 110, and 112 may be modified by a user, a device manufacturer, a network operator, and/or the like.

FIG. 1B is a diagram showing a representation of a user identity profile 120 according to an example embodiment of the invention. Block 122 relates to a continuum with a low end 124 and a high end 134. Blocks 126, 128, 130, and 132 relate to information controls arranged with respect to continuum 122. In an example embodiment, information control 126 is arranged higher than low end 124, but arranged lower than information control 128, which is arranged lower than information control 130, which is arranged lower than information control 132, which is arranged lower than high end 134.

In the example of FIG. 1B, selection 136 represents a part of continuum 122. Selection 136 may be set using user identity profile setter 200 of FIG. 2A. In an example embodiment, selection 136 relates to a part of continuum 122 from low end 124 to a point between information controls 128 and 130. Selection 136 may relate to a percentage. For example, selection 136 may relate to 30% of continuum 122. In such an example, a percentage in relation to continuum 122 may indicate a selection from low end 124 to a point 30% along the continuum towards high end 134. Selection 136 may be utilized to determine, at least in part, an information control to utilize.

In an example embodiment, information control 126 may relate to utilizing an image for wallpaper on a virtual screen, for example virtual screen 502 of FIG. 5A, information control 128 may relate to displaying calendar information on a virtual screen, information control 130 may relate to utilizing an email account, and information control 132 may relate to utilizing user identity information for making a phone call. In such an example, selection 136 may indicate that the virtual screen may comprise the image as wallpaper and calendar information, but the email account may be unutilized and the user identity information may be unutilized for making a call.

FIG. 1C is a diagram showing a representation of a user identity profile 140 according to an example embodiment of the invention. Block 142 relates to a continuum with a low end 144 and a high end 154. Blocks 146, 148, 150, and 152 relate to information controls arranged with respect to continuum 142. In an example embodiment, information control 146 is arranged higher than low end 144, but arranged lower than information control 148, which is arranged lower than information control 150, which is arranged lower than information control 152, which is arranged lower than high end 154.

In the example of FIG. 1C, selection 156 represents a part of continuum 142. Selection 156 may be set using user identity profile setter 220 of FIG. 2B. In an example embodiment, selection 156 relates to a part of continuum 142 from a point between information controls 146 and 148 to a point between information controls 150 and 152. Selection 156 may relate to a range. For example, selection 156 may relate to a selection range between one fifth and one half of continuum 142. Selection 156 may be utilized to determine, at least in part, an information control to utilize.

Figure 5B:
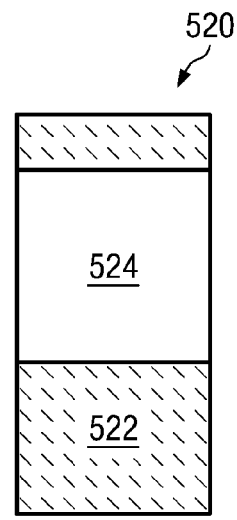

In an example embodiment, information control 146 may related to utilizing an image for wallpaper on a virtual screen, for example virtual screen 522 of FIG. 5B, information control 148 may relate to displaying calendar information on a virtual screen, information control 150 may relate to utilizing user identity information for making a phone call, and information control 152 may relate to utilizing an email account. In such an example, selection 156 may indicate that the virtual screen should comprise calendar information and for making a phone call, the user identity associated with user identity profile 142 may be utilized, but the virtual screen may not comprise the image as wallpaper and the email account may be unutilized.

In an example embodiment, an information control may be predefined. For example, an information control may be predefined to utilize the associated user identity for a phone call, to utilize an image for wallpaper, and/or the like. In another example embodiment, an information control may be modifiable. For example, an information control associated with a wallpaper image may be modified so that the wallpaper image is different. In another example, an information control associated with a program icon to be included on a virtual screen may be modified so that the information control associates with a different program.

In an example embodiment, a user identity profile may be predefined. For example, one or more information controls may be at predefined positions along a continuum. In another example embodiment, a user identity profile may be modifiable. For example, an information control may be added to a continuum, removed from a continuum, relocated on a continuum, and/or the like.

FIGS. 2A-2D are diagrams showing representations of a user identity profile setter according to example embodiments of the invention. One or more user identity profile may be set by an input operation related to utilization of a user identity profile setter. The input operation may be received from a keypad, such as keypad 30 of FIG. 8, a touch display, such as display 28 of FIG. 8, a motion sensor such as motion sensor 68 of FIG. 8, and or the like. The input operation may comprise one or more touch input, such as input 740 of FIG. 7C, input 760 of FIG. 7D, and/or the like, key press, motion, and/or the like.

Figure 2A:
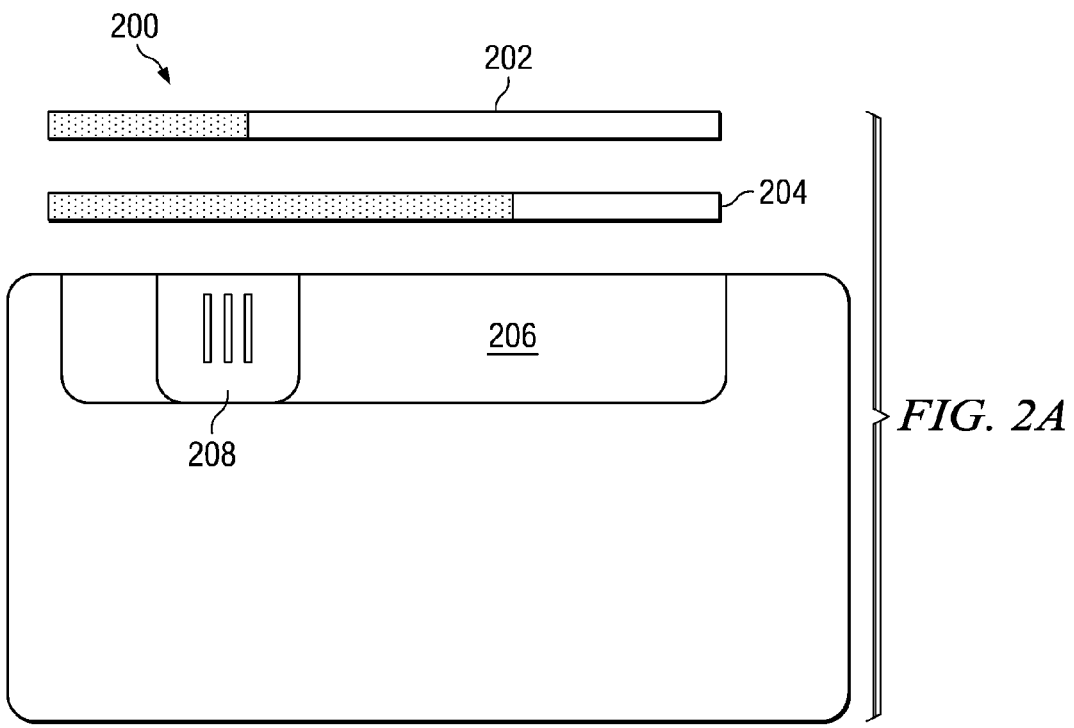
FIGS. 2A-2D are diagrams showing representations of a user identity profile setter according to example embodiments of the invention.

FIG. 2A is a diagram showing a representation of a user identity profile setter 200 according to an example embodiment of the present invention. In an example embodiment, slider 206 and position control 208 are utilized to set user identity profile 202 and user identity profile 204. For example, one end of slider 206 may relate to a user identity associated with user identity profile 202 and the other end of the slider may be associated with a different user identity associated with user identity profile 204. User identity profile 202 may be set to a selection percentage related to the location of position control 208 with respect to one end of slider 206. User identity profile 204 may be set to a selection percentage related to the location of position control 208 with respect to the other end of slider 206. For example, if position control 208 is 20% across slider 206, user identity profile 202 may be set to a selection percentage of 20% and user identity profile 204 may be set to a selection percentage of 80%.

Figure 2B:
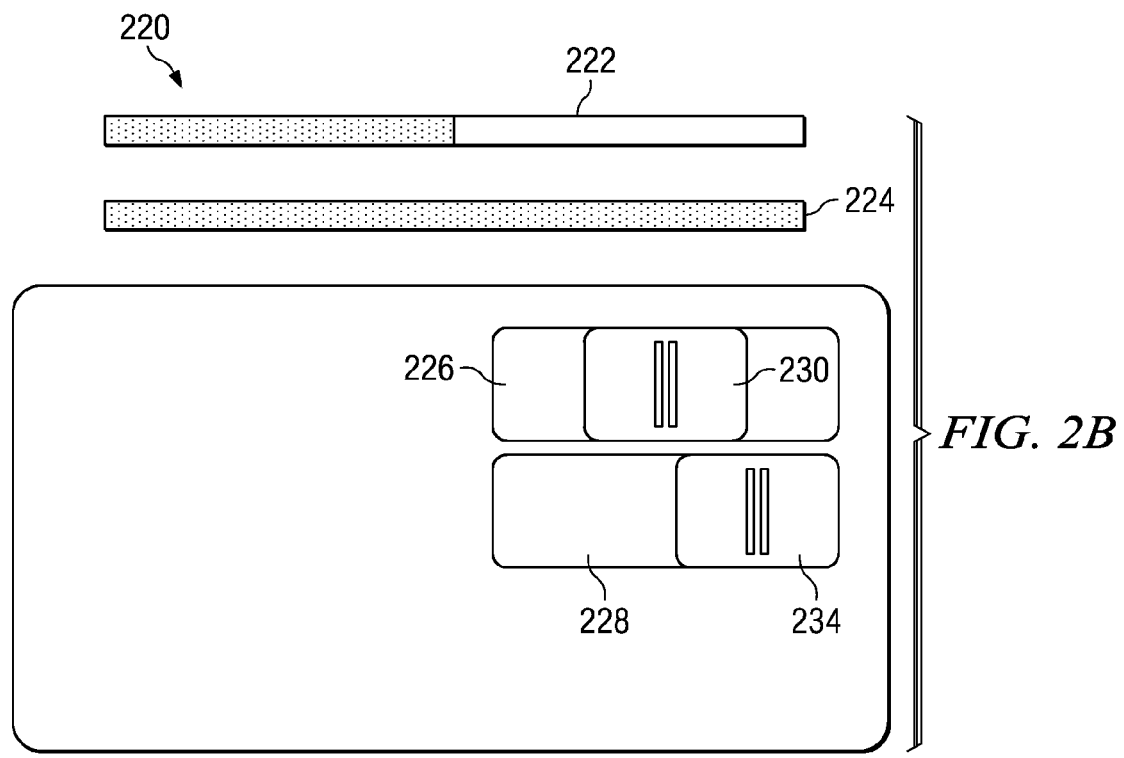

FIG. 2B is a diagram showing a representation of a user identity profile setter 220 according to an example embodiment of the present invention.

Slider 226 and position control 230 may be utilized to set user identity profile 222. For example, user identity profile 222 may be set to a selection percentage related to the location of position control 230 in relation to an end of slider 226. In such an example, if position control 230 is 50% across slider 226, user identity profile 222 may be set to a selection percentage of 50%.

Slider 228 and position control 234 may be utilized to set user identity profile 224. For example, user identity profile 224 may be set to a selection percentage related to the location of position control 234 in relation to an end of slider 228. In such an example, if position control 230 is 100% across slider 228, user identity profile 224 may be set to a selection percentage of 100%.

In an example embodiment, when conflicting information controls are selected, conflict resolution is performed. For example, if user identity profile 224 is set to 100% and user identity profile 222 is set to 100%, an information control, such as wallpaper, of user identity profile 224 may conflict with an information control of user identity profile 222. Conflict resolution may comprise random selection of an information control, a combining of information controls, a default prioritization of an information control, and/or the like.

Figure 2C:
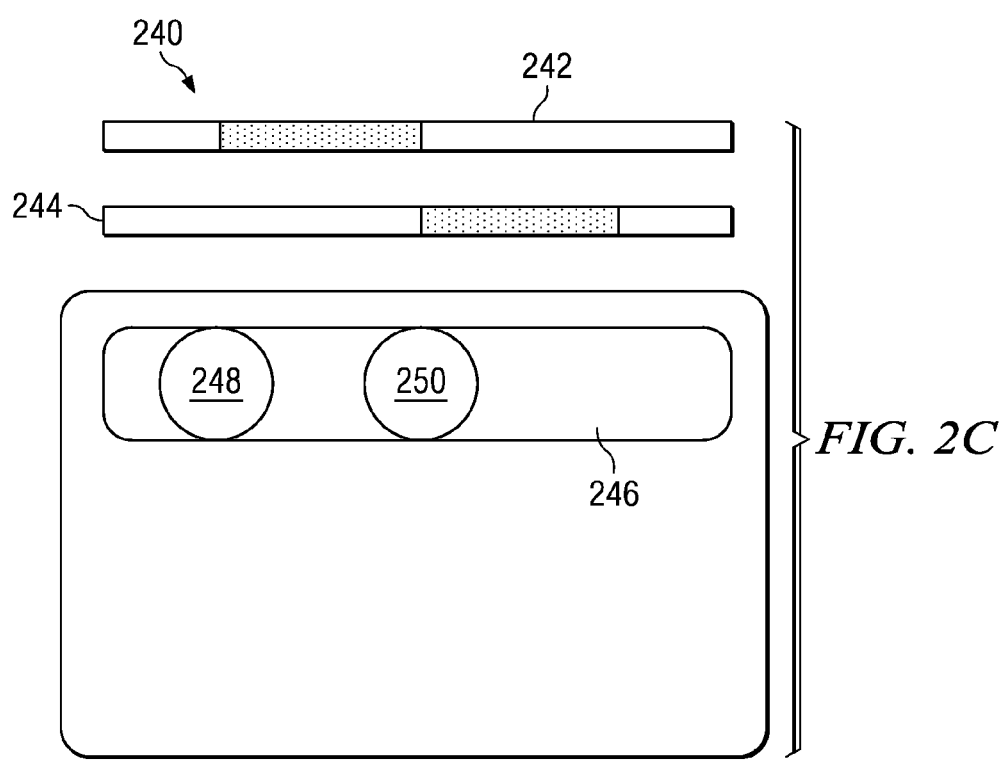

FIG. 2C is a diagram showing a representation of a user identity profile setter 240 according to an example embodiment of the present invention. In an example embodiment, slider 246 and position controls 248 and 250 are utilized to set user identity profile 242 and user identity profile 244. For example, one end of slider 246 may relate to a user identity associated with user identity profile 242 and the other end of the slider may be a different user identity associated with user identity profile 244. User identity profile 242 may be set to a selection range related to the location of position controls 248 and 250 with respect to one end of slider 246. User identity profile 244 may be set to a selection range related to the location of position control 248 and 250 with respect to the other end of slider 246. For example, if position control 248 is 15% across slider 246 and position control 250 is 50% across slider 246, user identity profile 242 may be set to a selection range between 15% and 50%, and user identity profile 244 may be set to a selection range between 50% and 85%.

Figure 2D:
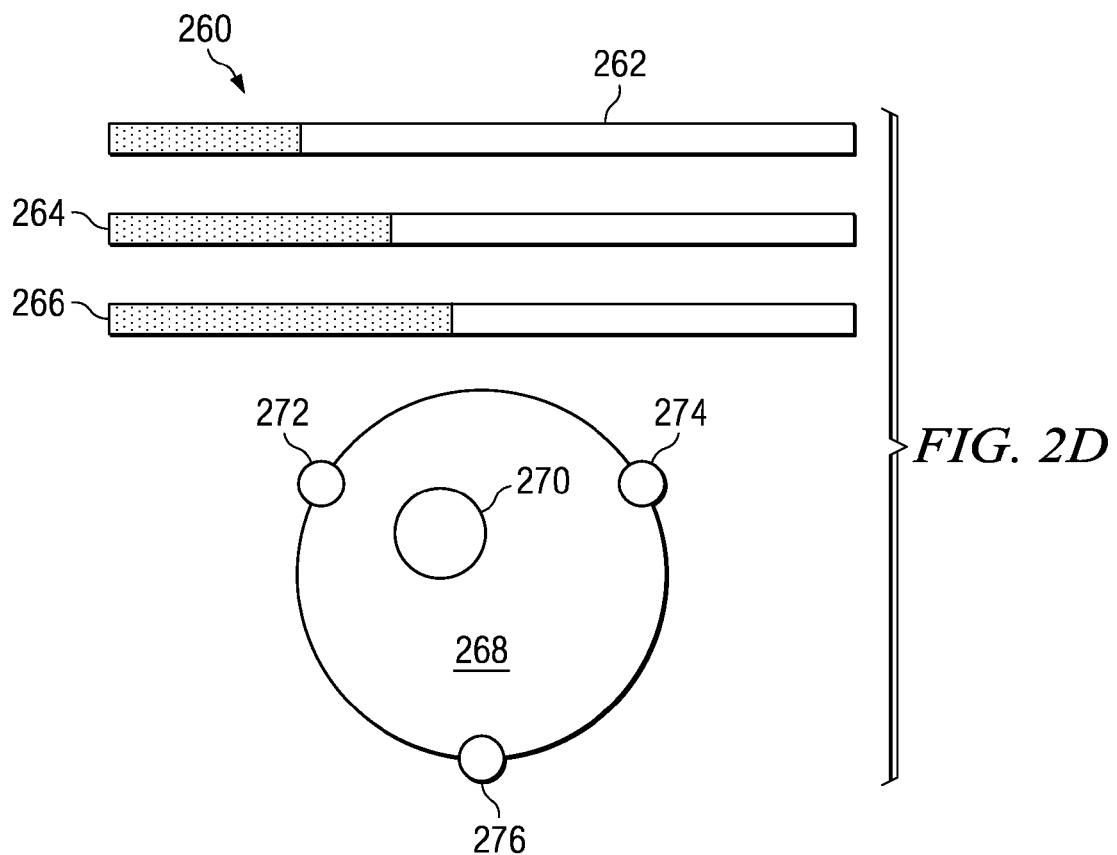

FIG. 2D is a diagram showing a representation of a user identity profile setter 260 according to an example embodiment of the present invention. In an example embodiment, dual-axis slider 268 and position control 270 and reference points 272, 274, and 276 are utilized to set user identity profiles 262, 264, and 266.

In an example embodiment, a user identity profile is set according to the distance between the slider and each reference point. For example, a percentage may be associated with a reference point by dividing the reference point distance from the position control by the sum of each reference point distance from the position control, as exemplified in the equation below. $P_x$ relates to the percentage associated with a reference point x. $D_x$ relates to the distance between the position control and reference point x, and i relates to the number of reference points.

$$P_x = \frac{D_x}{D_1 + D_2 + \ldots + D_i}$$

Reference point 272 may be related to a user identity associated with user identity profile 262. Reference point 274 may be related to a user identity associated with user identity profile 264. Reference point 276 may be related to a user identity associated with user identity profile 266. If reference point 272 has an associated percentage of 22%, user identity profile 262 may be set to a selection percentage of 22%. If reference point 274 has an associated percentage of 33%, user identity profile 264 may be set to a selection percentage of 33%. If reference point 276 has an associated percentage of 45%, user identity profile 276 may be set to a selection percentage of 45%.

Figure 3:
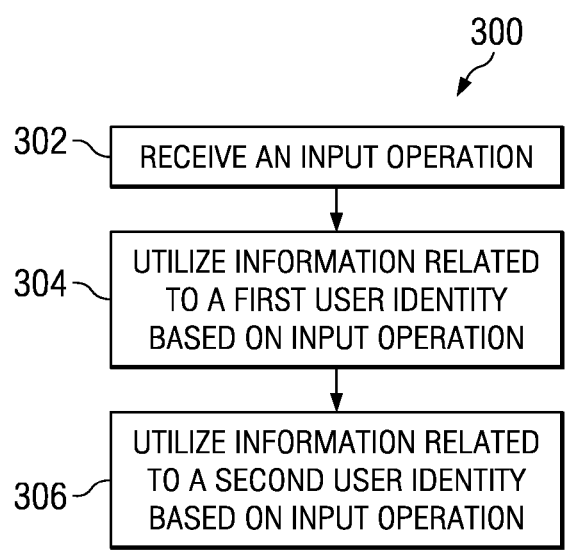
FIG. 3 is a flow diagram showing a method for using a plurality of user identities according to an example embodiment of the invention.

FIG. 3 is a flow diagram showing a method 300 for using a plurality of user identities according to an example embodiment of the invention.

At block 302, an input operation is received. The input operation may comprise one or more inputs such as a key press, a motion, a touch input, such as input 740 of FIG. 7C, and/or the like. The input operation may be received from a keypad, such as keypad 30 of FIG. 8, a touch display, such as display 28 of FIG. 8, a motion sensor, such as motion sensor 68 of FIG. 8, and/or the like. The input may be utilized with a user identity profile setter, for example user identity profile setter 200 of FIG. 2A, user identity profile setter 220 of FIG. 2B, and/or the like.

At block 304, information related to a first user identity is utilized based, at least in part, on the input operation. For example, utilization of information related to the first user identity may comprise utilization of contact information, account information, and/or the like. In another example, utilization of information related to the first user identity may comprise setting volume, user identity utilization for a phone call, user identity utilization for a message, and/or the like. In yet another example, utilization of information related to the first user identity may comprise providing information on a virtual screen relating to a wallpaper, a program, a calendar, text information, and/or the like. The input operation may be utilized to determine one or more information controls to be selected relating to a user identity. For example, the input operation may be utilized to determine selection 136 of FIG. 1B.

At block 306, information related to a second user identity is utilized based, at least in part, on the input operation. For example, utilization of information related to the second user identity may comprise utilization of contact information, account information, and/or the like. In another example, utilization of information related to the second user identity may comprise setting volume, user identity utilization for a phone call, user identity utilization for a message, and/or the like. In yet another example, utilization of information related to the second user identity may comprise providing information on a virtual screen relating to a wallpaper, a program, a calendar, text information, and/or the like. The input operation may be utilized to determine one or more information controls to be selected relating to a user identity. For example, the input operation may be utilized to determine selection 136 of FIG. 1B.

Figure 4:
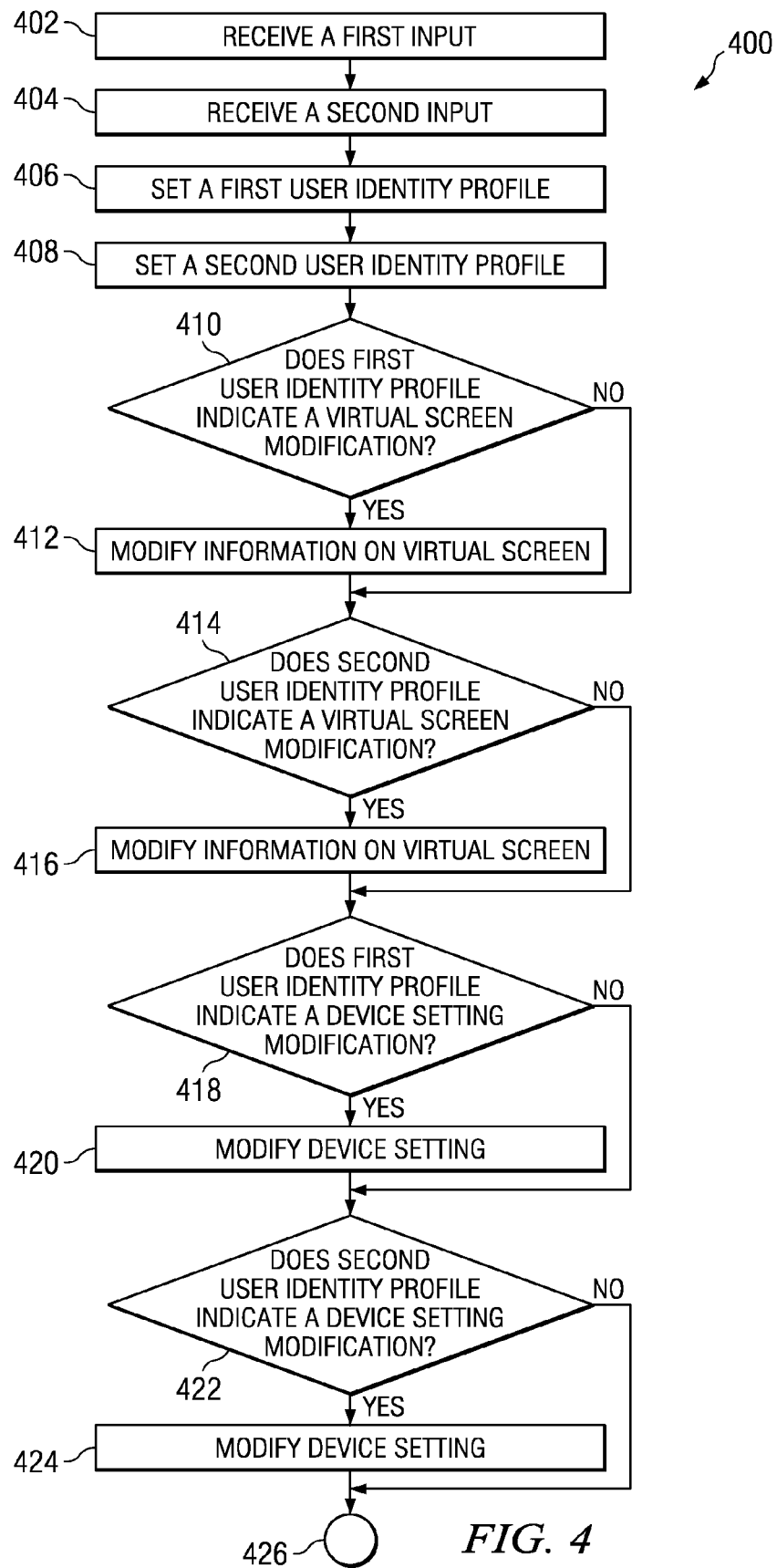
FIG. 4 is a flow diagram showing another method for using a plurality of user identities according to an example embodiment of the invention.

FIG. 4 is a flow diagram showing another method 400 for using a plurality of user identities according to an example embodiment of the invention.

At block 402, a first input is received. The input may be received from a keypad, such as keypad 30 of FIG. 8, a touch display, such as display 28 of FIG. 8, a motion sensor, such as motion sensor 68 of FIG. 8, and/or the like. The input may comprise a key press, a motion, a touch input, such as input 740 of FIG. 7C, and/or the like. The input may be utilized with a user identity profile setter, for example user identity profile setter 220 of FIG. 2B.

At block 404, a second input is received. The input may be received from a keypad, such as keypad 30 of FIG. 8, a touch display, such as display 28 of FIG. 8, a motion sensor, such as motion sensor 68 of FIG. 8, and/or the like. The input may comprise a key press, a motion, a touch input, such as input 740 of FIG. 7C, and/or the like. The input may be utilized with a user identity profile setter, for example user identity profile setter 240 of FIG. 2C.

At block 406, a first user identity profile, for example user identity profile 140 of FIG. 1C, associated with a first user identity is set. The setting may comprise selecting a range, a percentage, and/or the like, such as selection 136 of FIG. 1B. The first user identity may comprise a user identity module (UIM), for example, UIM 38 of FIG. 8.

At block 408, a second user identity profile, for example user identity profile 140 of FIG. 1C, associated with a second user identity is set. The setting may comprise selecting a range, a percentage, and/or the like, such as selection 136 of FIG. 1B. The second user identity may comprise a user identity module (UIM), for example, UIM 38 of FIG. 8.

At block 410, it is determined whether the first user identity profile indicates a virtual screen modification. For example, the setting of block 406 may comprise one or more information control related to information associated with the virtual screen. If it is determined that the first user identity profile comprises an information control related to information associated with a virtual screen, flow may proceed to block 412. Otherwise, flow may proceed to block 414.

Figure 5C:
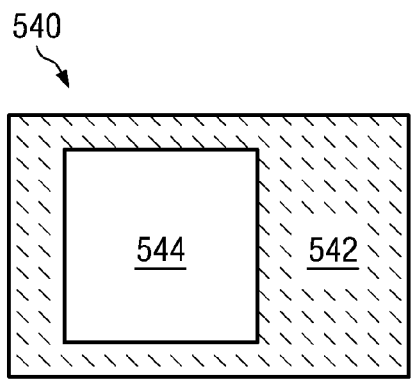

At block 412, information on the virtual screen, for example virtual screen 542 of FIG. 5C, is modified based at least in part on the first user identity profile. For example, virtual screen information related to a wallpaper, a program, a calendar, text information, and/or the like may be modified.

At block 414, it is determined whether the second user identity profile indicates a virtual screen modification. For example, the setting of block 408 may comprise one or more information control related to information associated with the virtual screen. If it is determined that the second user identity profile comprises an information control related to information associated with a virtual screen, flow may proceed to block 416. Otherwise, flow may proceed to block 418.

At block 416, information on the virtual screen, for example virtual screen 542 of FIG. 5C, is modified based at least in part on the second user identity profile. For example, virtual screen information related to a wallpaper, a program, a calendar, text information, and/or the like may be modified.

At block 418, it is determined whether the first user identity profile indicates a device setting modification. For example, the setting of block 406 may comprise one or more information control related to information associated with a device setting. If it is determined that the first user identity profile comprises an information control related to information associated with a virtual screen, flow may proceed to block 420. Otherwise, flow may proceed to block 422.

At block 420, the device setting is modified based at least in part on the first user identity profile. For example, device setting information related to volume, user identity utilization for a phone call, user identity utilization for a message, and/or the like may be modified.

At block 422, it is determined whether the second user identity profile indicates a device setting modification. For example, the setting of block 408 may comprise one or more information control related to information associated with a device setting. If it is determined that the second user identity profile comprises an information control related to information associated with a virtual screen, flow may proceed to block 412. Otherwise, flow may exit at block 426.

At block 424, the device setting is modified based at least in part on the second user identity profile. For example, device setting information related to volume, user identity utilization for a phone call, user identity utilization for a message, and/or the like may be modified.

FIGS. 5A-5D are diagrams illustrating a virtual screen according to an example embodiment of the invention.

FIG. 5A is a diagram illustrating a virtual screen wider than the part of the virtual screen displayed, for example on screen 600 of FIG. 6A. In the example of FIG. 5A, block 502 relates to a virtual screen, and block 504 relates to a frame that displays part of virtual screen 502. The virtual screen 502 may represent an image, text, a group of items, a list, a work area, and/or the like. For example, if an image is wider than what is desirable to represent on a display, virtual screen 502 may be used for the image. In such an example, the frame 504 may be panned left or right to change the part of the virtual screen 502 that is displayed. In an example embodiment, changing the part of the virtual screen 502 that is displayed may be performed when input is received, for example input 720 of FIG. 7B, input 740 of FIG. 7C, and/or the like. In an example embodiment, frame 504 may be prevented from panning beyond the boundary of virtual screen 502.

Figure 6B:
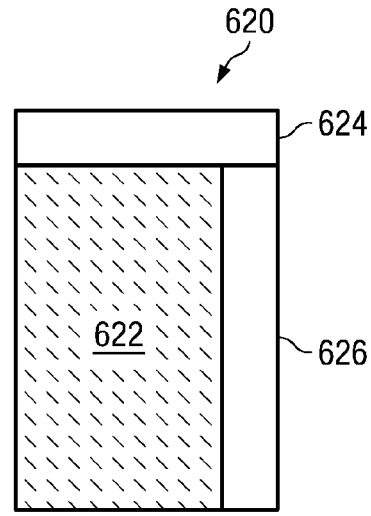

FIG. 5B is a diagram illustrating a virtual screen taller than the part of the virtual screen displayed, for example on screen 620 of FIG. 6B. In the example of FIG. 5B, block 522 relates to a virtual screen, and block 524 relates to a frame that displays part of virtual screen 522. The virtual screen 522 may represent an image, text, a group of items, a list, a work area, and/or the like. For example, if group of items, such as a group of icons, is taller than what is desirable to represent on a display, virtual screen 522 may be used for the group of icons. In such an example, the frame 524 may be panned up or down to change the part of the virtual screen 522 that is displayed. In an example embodiment, changing the part of the virtual screen 522 that is displayed may be performed when input is received, for example input 720 of FIG. 7B, input 740 of FIG. 7C, and/or the like. In an example embodiment, frame 524 may be prevented from panning beyond the boundary of virtual screen 522.

FIG. 5C is a diagram illustrating a virtual screen wider and taller than the part of the virtual screen displayed, for example on screen 600 of FIG. 6A. In the example of FIG. 5C, block 542 relates to a virtual screen, and block 544 relates to a frame that displays part of virtual screen 542. The virtual screen 542 may represent an image, text, a group of items, a list, a work area, and/or the like. For example, if list is longer than what is desirable to represent on a display, virtual screen 542 may be used for the work area. In such an example, the displayed part 544 may be panned left, right, up, and/or down to change the part of the virtual screen 542 that is displayed. In an example embodiment, changing the part of the virtual screen 542 that is displayed may be performed when input is received, for example input 720 of FIG. 7B, input 740 of FIG. 7C, and/or the like. In an example embodiment, frame 544 may be prevented from panning beyond the boundary of virtual screen 542.

Figure 5D:
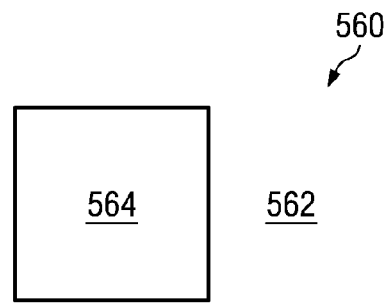

FIG. 5D is a diagram illustrating a virtual screen is the same size as the part of the virtual screen displayed. In the example of FIG. 5D, block 562 relates to a virtual screen, and block 564 relates to a frame that displays part of virtual screen 562. The virtual screen 562 may represent an image, text, a group of items, a list, a work area, and/or the like. For example, if it is desirable to represent an entire image on a display, virtual screen 562 may be used to display the image.

FIGS. 6A and 6B are diagrams illustrating a screen according to an example embodiment of the invention. It should be understood that the screens of FIGS. 6A and 6B are merely examples of possible screen arrangements which may be used and therefore should not limit the scope of the present invention.

FIG. 6A is a diagram illustrating a screen comprising frames 602, 604, and 606. Frames 602, 604, and 606 may relate to the displayed part of one or more virtual screen. For example, frame 602 may relate to frame 544 of FIG. 5C. In another example, frame 604 may relate to frame 564 of FIG. 5D. In still another example, frame 606 may relate to frame 504 of FIG. 5A.

In an example embodiment, frame 604 comprises device operating information, such as battery information, signal information, network information, and/or the like. In another example embodiment, frame 602 comprises icons representing programs which may be utilized, such as games, image viewers, and/or the like. In still another example embodiment, frame 606 comprises icons representing device operations which may be performed, such as composing a message, making a call, and/or the like.

FIG. 6B is a diagram illustrating a screen comprising frames 622, 624, and 626. Frames 622, 624, and 626 may relate to the displayed part of one or more virtual screen. For example, frame 622 may relate to frame 544 of FIG. 5C. In another example, frame 604 may relate to frame 564 of FIG. 5D. In still another example, frame 606 may relate to frame 504 of FIG. 5A.

In an example embodiment, frame 624 comprises device operating information, such as battery information, signal information, network information, and/or the like. In another example embodiment, frame 622 comprises icons representing programs which may be utilized, such as games, image viewers, and/or the like. In still another example embodiment, frame 626 comprises icons representing device operations which may be performed, such as composing a message, making a call, and/or the like.

It should be understood that example embodiments may vary with respect to the number of frames on a screen and/or the placement of frames on a screen.

Figure 7A:
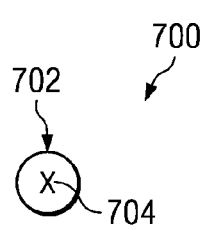
FIGS. 7A-7D are diagrams illustrating input from a touch display according to an example embodiment of the invention.
Figure 7B:
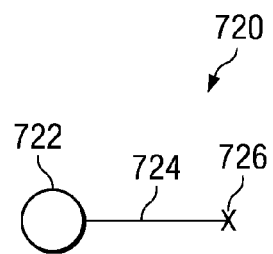
Figure 7C:
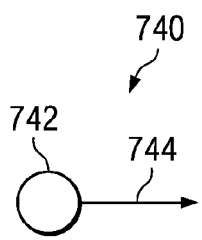
Figure 7D:
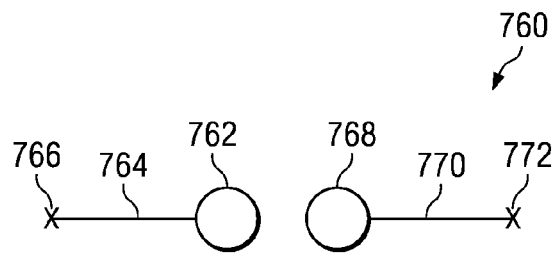
Figure 8:
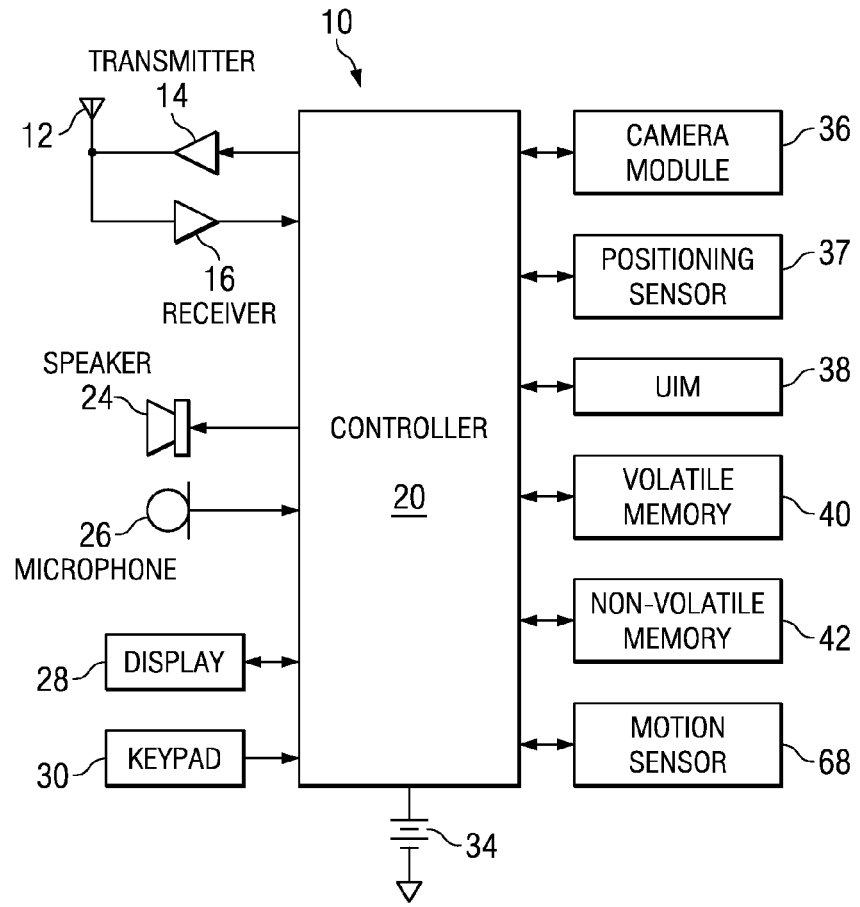
FIG. 8 is a block diagram showing an electronic device according to an example embodiment of the invention.

FIGS. 7A-7D are diagrams illustrating input from a touch display, for example from display 28 of FIG. 8, according to an example embodiment of the invention. In FIGS. 7A-7D, an input related to contact with a touch display is shown with a circle, an input related to releasing a contact from a touch display is shown with two crossed lines, and input related to movement on a touch display is shown with a line.

In the example of FIG. 7A, input 700 relates to receiving contact input 702 and receiving a release input 704 are shown. In this example, contact input 702 and release input 704 occur at the same position. In an example embodiment, the time between receiving contact input 702 and release input 704 may be utilized. For example, input 700 of FIG. 7A may be interpreted as a tap for a short time between contact input 702 and release input 704, a press for less short time between contact input 702 and release input 704, and/or the like. In such an example, a tap input may induce one operation, such as selecting an item, and a press input may induce another operation, such as performing an operation on an item.

In the example of FIG. 7B, input 720 relates to receiving contact input 722, a movement input 724, and a release input 726 are shown. In this example, contact input 722 and release input 726 occur at different positions. Input 720 may be utilized to drag an object from one position to another, to move a scroll bar, to pan a virtual screen, and/or the like. In an example embodiment, input 720 of FIG. 7B is interpreted differently based at least in part on the speed of movement 724. For example, if input 720 is utilized to pan a virtual screen, the panning motion may be small for a slow movement, large for a fast movement, and/or the like.

In the example of FIG. 7C, input 740 relates to receiving contact input 742, and a movement input 744, where contact is released during movement. Input 740 may be utilized to move an object from one position to another, to move a scroll bar, to pan a virtual screen, and/or the like. In an example embodiment, input 740 of FIG. 7C is interpreted differently based at least in part on the speed of movement 744. For example, if input 740 is utilized to pan a virtual screen, the panning motion may be small for a slow movement, large for a fast movement, and/or the like.

In the example of FIG. 7D, input 760 relates to receiving contact inputs 762 and 768, movement inputs 764 and 770, and release inputs 766 and 772. In this example, contact input 762 and 768, and release input 766 and 772 occur at different positions. Input 760 may be utilized to drag objects from one position to another, to move position controls, to zoom a virtual screen, and/or the like. In an example embodiment, input 760 is interpreted differently based at least in part on the speed of movements 764 and 770. For example, if input 760 is utilized to zoom a virtual screen, the zooming motion may be small for a slow movement, large for a fast movement, and/or the like.

FIG. 8 is a block diagram showing an electronic device 10 according to an example embodiment of the invention. It should be understood, however, that a electronic device as illustrated and hereinafter described is merely illustrative of an electronic device that would benefit from embodiments of the present invention and, therefore, should not be taken to limit the scope of the present invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, cameras, video recorders, global positioning system (GPS) devices and other types of electronic systems, may readily employ embodiments of the present invention. Furthermore, devices may readily employ embodiments of the present invention regardless of their intent to provide mobility.

Even though embodiments of the present invention are described in conjunction with mobile communications applications, it should be understood that embodiments of the present invention may be utilized in conjunction with a variety of other applications, both in the mobile communications industries and outside of the mobile communications industries.

The electronic device 10 comprises an antenna 12 (or multiple antennae) in operable communication with a transmitter 14 and a receiver 16. The electronic device 10 further comprises a controller 20 or other processing element that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with second-generation (2G) wireless communication protocols IS-136 (TDMA), GSM, and IS-95 (CDMA), or with third-generation (3G) wireless communication protocols, such as UMTS, CDMA2000, WCDMA and TD-SCDMA, with fourth-generation (4G) wireless communication protocols, wireless networking protocols, such as 802.11, short-range wireless protocols, such as Bluetooth, and/or the like.

It is understood that the controller 20 comprises circuitry desirable for implementing audio, video, communication, navigation, logic functions, and or the like. For example, the controller 20 may comprise a digital signal processor device, a microprocessor device, various analog to digital converters, digital to analog converters, and other support circuits. Control and signal processing functions of the electronic device 10 are allocated between these devices according to their respective capabilities. The controller 20 thus may also comprise the functionality to encode and interleave message and data prior to modulation and transmission. The controller 20 may additionally comprise an internal voice coder, and may comprise an internal data modem. Further, the controller 20 may comprise functionality to operate one or more software programs, which may be stored in memory. For example, the controller 20 may operate a connectivity program, such as a conventional internet browser. The connectivity program may then allow the electronic device 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic device 10 may comprise a user interface for providing output and/or receiving input. The electronic device 10 may comprise an output device such as a ringer, a conventional earphone and/or speaker 24, a microphone 26, a display 28, and/or a user input interface, which are coupled to the controller 20. The user input interface, which allows the electronic device 10 to receive data, may comprise any of a number of devices allowing the electronic device 10 to receive data, such as a keypad 30, a touch display, for example if display 28 comprises touch capability, and/or the like. In an embodiment comprising a touch display, the touch display, the touch display may be configured to receive input from a single point of contact, multiple points of contact, and/or the like. In such an embodiment, the touch display may determine input based on position, motion, speed, contact area, and/or the like. In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the controller 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 comprises hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the controller 20 in the form of software for creating a digital image file from a captured image. In an example embodiment, the camera module 36 may further comprise a processing element such as a co-processor which assists the controller 20 in processing image data and an encoder and/or decoder for compressing and/or decompressing image data. The encoder and/or decoder may encode and/or decode according to a standard format, for example, a JPEG standard format.

The electronic device 10 may comprise one or more user identity modules (UIM) 38. The UIM may comprise information stored in memory of electronic device 10, a part of electronic device 10, a device coupled with electronic device 10, and/or the like. The UIM 38 may comprise a memory device having a built in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a subscriber, an operator, a user account, and/or the like. For example, UIM 38 may store subscriber information, message information, contact information, security information, program information, and/or the like. Usage of one or more UIM 38 may be enabled and/or disabled. For example, electronic device 10 may enable usage of a first UIM and disable usage of a second UIM.

In an example embodiment, electronic device 10 comprises a single UIM 38. In such an embodiment, at least part of subscriber information may be stored on the UIM 38.

In another example embodiment, electronic device 10 comprises a plurality of UIM 38. For example, electronic device 10 may comprise two UIM 38 blocks. In such an example, electronic device 10 may utilize part of subscriber information of a first UIM 38 under some circumstances and part of subscriber information of a second UIM 38 under other circumstances. For example, electronic device 10 may enable usage of the first UIM 38 and disable usage of the second UIM 38. In another example, electronic device 10 may disable usage of the first UIM 38 and enable usage of the second UIM 38. In still another example, electronic device 10 may utilize subscriber information from the first UIM 38 and the second UIM 38.

Electronic device 10 may comprise volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may additionally or alternatively comprise an EEPROM, flash memory or the like. The memories may store any of a number of pieces of information, and data. The information and data may be used by the electronic device 10 to implement the functions of the electronic device 10. For example, the memories may comprise an identifier, such as an international mobile equipment identification (IMEI) code, which may uniquely identify the electronic device 10.

Although FIG. 8 illustrates an example of an electronic device which may utilize embodiments of the present invention, it should be understood that the electronic device 10 of FIG. 8 is merely an example device that may utilize embodiments of the present invention.

A processing element such as those described may be embodied in various ways. For example, the processing element may be embodied as a processor, a coprocessor, a controller or various other processing means or devices including integrated circuits such as, for example, an ASIC (application specific integrated circuit), FPGA (field programmable gate array), and/or the like.

Without in any way limiting the scope, interpretation, or application of the claims appearing below, a technical effect of one or more of the example embodiments disclosed herein may be allowing a user to utilize information related to a first user identity and a second user identity. Another technical effect of one or more of the example embodiments disclosed herein may be allowing a user to modify a virtual screen based at least in part on information related to a first user identity and a second user identity. Another technical effect of one or more of the example embodiments disclosed herein may be allowing a user to modify a device setting based at least in part on a first user identity and a second user identity.

Embodiments of the present invention may be implemented in software, hardware, application logic or a combination of software, hardware and application logic. The software, application logic and/or hardware may reside on an electronic device, UIM, or another UIM. If desired, part of the software, application logic and/or hardware may reside on an electronic device, part of the software, application logic and/or hardware may reside on a UIM, and part of the software, application logic and/or hardware may reside on another UIM. The application logic, software or an instruction set is preferably maintained on any one of various conventional computer-readable media. In the context of this document, a "computer-readable medium" may be any media or means that can contain, store, communicate, propagate or transport the instructions for use by or in connection with an instruction execution system, apparatus, or device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   a processor and
   at least one memory that contains executable instructions that if executed by the processor cause the apparatus to:
   cause display of a representation of a first user identity profile, the first user identity profile being a continuum along which a plurality of information controls associated with a first user identity module are arranged, the first user identity module being a first removable device;
   cause display of a representation of a second user identity profile, the second user identity profile being another continuum along which a plurality of information controls associated with a second user identity module are arranged, the second user identity module being a second removable device that is coupled to the apparatus while the first removable device is coupled to the apparatus;

receive an input operation that selects a portion of the continuum of the user first user identity profile that includes at least one selected information control comprised by the first user identity profile associated with the first user identity module and that selects a portion of the continuum of the user second user identity profile that includes at least one selected information control comprised by the second user identity profile associated with the second user identity module; and utilize user identity information of the first user identity module based at least in part on the selected information control comprised by the first user identity profile concurrently with utilization of user identity information of the second user identity module based at least in part on the selected information control comprised by the second user identity profile.

2. The apparatus of claim 1, wherein said input operation comprises a first input that selects the portion of the continuum of the user first user identity profile and a second input that selects the portion of the continuum of the user second user identity profile.

3. The apparatus of claim 1, wherein the utilization of the user identity information of the first user identity module comprises modifying information associated with a virtual screen.

4. The apparatus of claim 1, wherein the utilization of the user identity information of the second user identity module comprises modifying information associated with a virtual screen.

5. The apparatus of claim 1, wherein the utilization of the user identity information of the first user identity module comprises modifying a device setting.

6. The apparatus of claim 1, wherein the utilization of the user identity information of the second user identity module comprises modifying a device setting.

7. A method, comprising:
causing display of a representation of a first user identity profile, the first user identity profile being a continuum along which a plurality of information controls associated with a first user identity module are arranged, the first user identity module being a first removable device;

causing display of a representation of a second user identity profile, the second user identity profile being another continuum along which a plurality of information controls associated with a second user identity module are arranged, the second user identity module being a second removable device that is coupled to the apparatus while the first removable device is coupled to the apparatus;

receiving an input operation that selects a portion of the continuum of the user first user identity profile that includes at least one selected information control comprised by the first user identity profile associated with the first user identity module and that selects a portion of the continuum of the user second user identity profile that includes at least one selected information control comprised by the second user identity profile associated with the second user identity module; and utilizing user identity information of the first user identity module based at least in part on the selected information control comprised by the first user identity profile concurrently with utilization of user identity information of the second user identity module based at least in part on the selected information control comprised by the second user identity profile.

8. The method of claim 7, wherein said input operation comprises a first input that selects the portion of the continuum of the user first user identity profile and a second input that selects the portion of the continuum of the user second user identity profile.

9. The method of claim 7, wherein the utilization of the user identity information of the first user identity module comprises modifying information associated with a virtual screen.

10. The method of claim 7, wherein the utilization of the user identity information of the first user identity module comprises modifying a device setting.

11. A computer program product comprising a non-transitory computer-readable medium bearing computer program code embodied therein for use with a computer, the computer program code comprising:
code for causing display of a representation of a first user identity profile, the first user identity profile being a continuum along which a plurality of information controls associated with a first user identity module are arranged, the first user identity module being a first removable device;

code for causing display of a representation of a second user identity profile, the second user identity profile being another continuum along which a plurality of information controls associated with a second user identity module are arranged, the second user identity module being a second removable device that is coupled to the apparatus while the first removable device is coupled to the apparatus;

code for receiving an input operation that selects a portion of the continuum of the user first user identity profile that includes at least one selected information control comprised by the first user identity profile associated with the first user identity module and that selects a portion of the continuum of the user second user identity profile that includes at least one selected information control comprised by the second user identity profile associated with the second user identity module; and code for utilizing user identity information of the first user identity module based at least in part on the selected information control comprised by the first user identity profile concurrently with utilization of user identity information of the second user identity module based at least in part on the selected information control comprised by the second user identity profile.

12. An apparatus, comprising:
means for causing display of a representation of a first user identity profile, the first user identity profile being a continuum along which a plurality of information controls associated with a first user identity module are arranged, the first user identity module being a first removable device;

means for causing display of a representation of a second user identity profile, the second user identity profile being another continuum along which a plurality of information controls associated with a second user identity module are arranged, the second user identity module being a second removable device that is coupled to the apparatus while the first removable device is coupled to the apparatus;

means for receiving an input operation that selects a portion of the continuum of the user first user identity profile that includes at least one selected information control comprised by the first user identity profile associated with the first user identity module and that selects a portion of the continuum of the user second user identity profile that includes at least one selected information control comprised by the second user identity profile associated with the second user identity module; and means for utilizing user identity information of the first user identity module based at least in part on the selected information control comprised by the first user identity profile concurrently with utilization of user identity information of the second user identity module based at least in part on the selected information control comprised by the second user identity profile.

13. The apparatus of claim 1, wherein utilization of the user identity information of the first user identity module comprises utilization of the user identity information for making a phone call.

14. The apparatus of claim 1, wherein utilization of the user identity information of the first user identity module comprises utilization of the user identity information for receiving a phone call.

15. The apparatus of claim 14, wherein utilization of the user identity information of the second user identity module comprises utilization of the user identity information for forwarding a phone call.

16. The apparatus of claim 1, wherein the input operation comprises selecting at least one of a range that designates the portion of the continuum of the first user identity profile that includes the selected information control comprised by the first user identity profile or a percentage that designates the portion of the continuum of the first user identity profile that includes the selected information control comprised by the first user identity profile.

17. The apparatus of claim 1, wherein the input operation comprises selecting at least one of a range that designates the portion of the continuum of the second user identity profile that includes the selected information control comprised by the second user identity profile or a percentage that designates the portion of the continuum of the second user identity profile that includes the selected information control comprised by the second user identity profile.

18. The apparatus of claim 1, wherein the user identity information of the first user identity module comprises contact information.

19. The apparatus of claim 1, wherein the first user identity module is a subscriber identity module and the second user identity module is a different subscriber identity module.

20. The apparatus of claim 1, wherein the user identity information of the second user identity module comprises at least one of contact information or account information.

21. The method of claim 7, wherein utilization of the user identity information of the first user identity module comprises utilization of the user identity information for making a phone call.

22. The method of claim 7, wherein utilization of the user identity information of the first user identity module comprises utilization of the user identity information for receiving a phone call.

23. The method of claim 22, wherein utilization of the user identity information of the second user identity module comprises utilization of the user identity information for forwarding a phone call.

24. The method of claim 7, wherein the input operation comprises selecting at least one of a range that designates the portion of the continuum of the first user identity profile that includes the selected information control comprised by the first user identity profile or a percentage that designates the portion of the continuum of the first user identity profile that includes the selected information control comprised by the first user identity profile.

25. The method of claim 7, wherein the input operation comprises selecting at least one of a range that designates the portion of the continuum of the second user identity profile that includes the selected information control comprised by the second user identity profile or a percentage that designates the portion of the continuum of the second user identity profile that includes the selected information control comprised by the second user identity profile.

26. The method of claim 7, wherein the user identity information of the first user identity module comprises contact information.

27. The method of claim 7, wherein the first user identity module is a subscriber identity module and the second user identity module is a different subscriber identity module.

28. The method of claim 7, wherein the user identity information of the second user identity module comprises at least one of contact information or account information.

29. The computer program product of claim 11, wherein said input operation comprises a first input that selects the portion of the continuum of the user first user identity profile and a second input that selects the portion of the continuum of the user second user identity profile.

30. The computer program product of claim 11, wherein the input operation comprises selecting at least one of a range that designates the portion of the continuum of the first user identity profile that includes the selected information control comprised by the first user identity profile or a percentage that designates the portion of the continuum of the first user identity profile that includes the selected information control comprised by the first user identity profile.

* * * * *